Oct. 21, 1947.　　　V. E. GLEASMAN　　　2,429,578
CHECK VALVE
Filed April 27, 1945
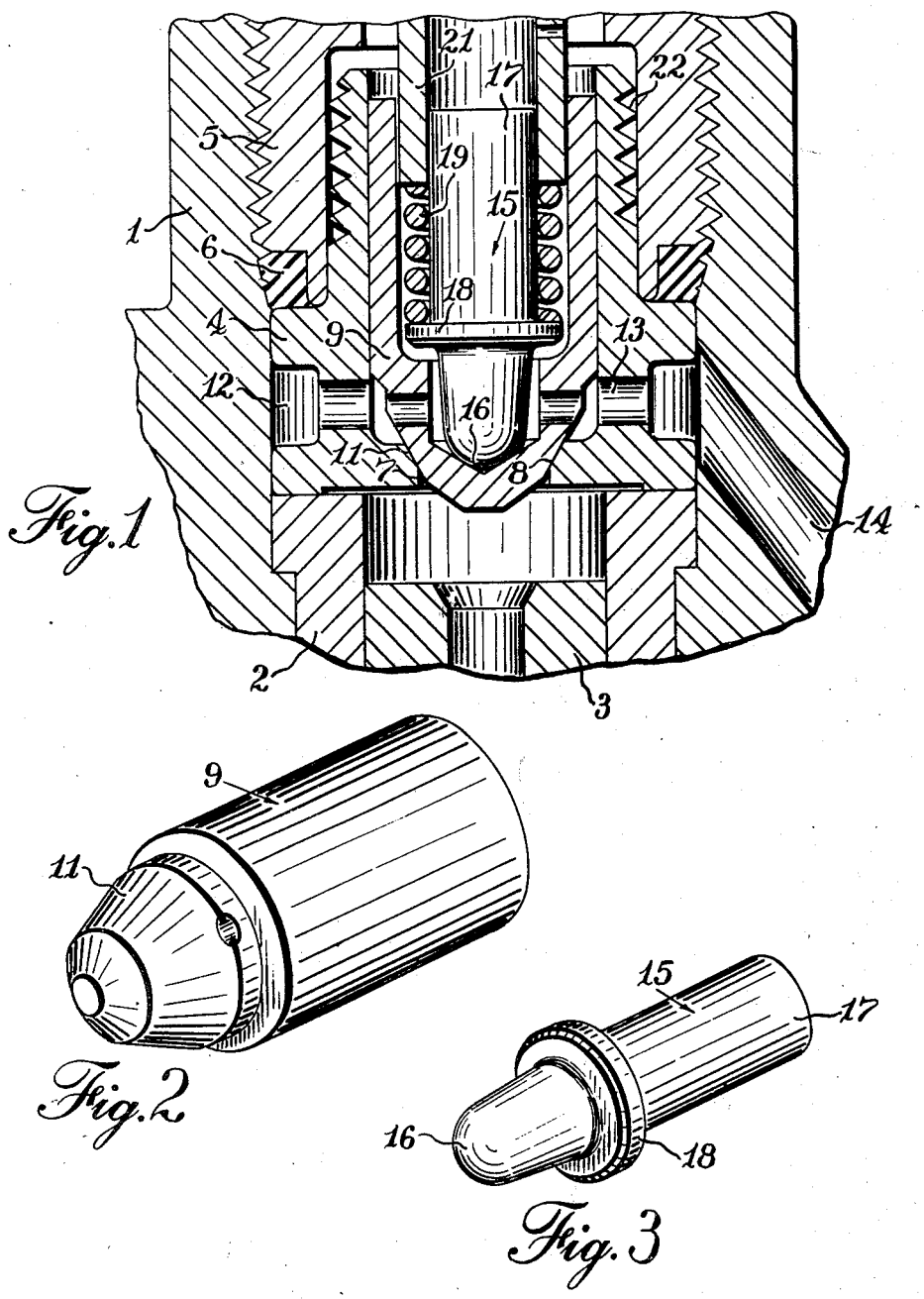
INVENTOR.
Vernon E. Gleasman
BY
ATTORNEY
WITNESS
Esther M. Stockton Patented Oct. 21, 1947

2,429,578

UNITED STATES PATENT OFFICE 2,429,578

CHECK VALVE

Vernon E. Gleasman, Elmira, N. Y., assignor to Bendix Aviation Corporation, South Bend, Ind., a corporation of Delaware Application April 27, 1945, Serial No. 590,642

2 Claims. (Cl. 251—144)

The present invention relates to check valves and more particularly to valves for positively controlling the flow of small quantities of liquid under high pressure.

In direct injection fuel systems for internal combustion engines, it is important to accurately meter the small quantity of the liquid fuel pumped under high pressure to each cylinder of the engine. When check valves are used to prevent release of the pressure during the intervals between injection periods, these valves must therefore fit tightly and seat perfectly.

It has heretofore been attempted to secure these results by using a valve member in the form of a cup-shaped piston having a conical end adapted to fit closely a correspondingly shaped seat and pressed into engagement therewith by a suitable spring. It has been found in practice, however, that when the parts are formed with the clearances necessary for freedom of action, the pressure of the spring on the valve sometimes causes it to cock slightly or fail to properly center itself in its seat with the result that leakage occurs.

It is an object of the present invention to provide a novel check valve which will remain free from leakage over long periods of use.

It is another object to provide such a device which is self-centering and self-aligning.

It is another object to provide a novel spring loaded check valve in which the pressure of the spring is so applied as to draw the valve into its seat rather than to push it onto its seat.

Further objects and advantages will be apparent from the following description taken in connection with the accompanying drawing in which:

Fig. 1 is a vertical section of a portion of a fuel injection pump incorporating a preferred form of applicant's novel check valve;

Fig. 2 is a detail in perspective of the movable check valve member; and

Fig. 3 is a detail in perspective of the spring pressed plunger for drawing the valve member into its seat.

In Fig 1 of the drawing there is illustrated a portion of a pump housing 1 in which is mounted a pump cylinder 2 containing a reciprocatory piston 3. A valve chamber 4 is seated in the housing 1 on the end of the pump cylinder 2 and is held in sealing engagement therewith by a gland 5 threaded in the housing 1, a packing ring 6 being interposed between the gland and the body of the valve chamber.

The lower end of the valve chamber is provided with an orifice 7 opening into the pump cylinder 2, and surrounding this orifice is an annular valve seat 8 of conical form. A cup-shaped valve member 9 is slidably located in the chamber 4, and has a dome-shaped bottom, on which is formed a conical surface 11 conforming closely to the valve seat 8 so as to form a liquid-tight seal when pressed into engagement therewith.

The valve chamber 4 is provided with an annular channel or recess 12 and a plurality of apertures 13 connecting the channel with the interior of the chamber. Liquid which enters the chamber when the valve member is raised from its seat can escape through the apertures to the channel, from whence it can flow through a conduit 14 in the pump housing to any suitable means not illustrated for conducting the liquid to the injection apparatus of the internal combusion engine or other device to be supplied with liquid.

According to the present invention, the pressure for seating the valve member 9 in the bottom of the chamber 4 is applied to the valve member near the zone of the valve seat, and preferably below the medial plane of that seat so as to draw the valve member into its seat. As here shown, this is accomplished by means of a plunger 15 loosely mounted in the valve member 9 and having a rounded point 16 which bears on the bottom of the valve member so as to apply axial pressure thereto, the place of application of the pressure being slightly below the medial plane of the valve seat 8. The plunger 15 has a cylindrical stem 17, and a radial flange 18 near its lower end, and a compression spring 19 is arranged to loosely surround the stem of the plunger and bear on the flange. Means for compressing the spring and at the same time forming a guide for the stem 17 of the plunger is provided in the form of a sleeve 21 mounted in the pump housing 1 and preferably adjustable longitudinally in any suitable manner in order to secure the desired compression of the spring 19.

The upper end of the valve chamber 4 is preferably threaded as indicated at 22 in order to facilitate withdrawal of the valve chamber from the pump housing 1 after removal of the gland 5. This arrangement permits the use of a threaded extractor for drawing the chamber from the pump housing.

In the operation of this device, actuation of the piston 3 applies pressure to the liquid in cylinder 2, whereby the valve member 9 is raised against the pressure of spring 19. The liquid thereupon escapes between the valve member and its seat, and passes out through the passages 13, channel 12 and conduit 14. During the suction stroke of the piston 3, the valve member 9 is seated by the spring 19, and since the place of application of the pressure from said spring to the valve member is below the medial plane of the valve seat, it is obvious that the tendency is to lead or draw the valve into proper centered relation with its seat so as to unfailingly secure a tight seal between the surfaces of the valve member and seat.

Although but one embodiment of the invention has been shown and described in detail, it will be understood that other embodiments are possible and that variations in the design and arrangement of the parts may be made without departing from the spirit of the invention as defined in the claims appended hereto.

What is claimed is:

1. In a check valve assembly, a housing, a cylindrical valve chamber seated in the housing, means including a gland member threaded into the housing in telescopic relation with the valve chamber for maintaining the valve chamber in sealed engagement with the housing, said valve chamber having a central orifice at one end surrounded by an annular valve seat, a hollow cylindrical valve member slidably mounted in said chamber having a domed end with a surface conforming to the valve seat, a plunger within the valve member bearing on the interior of said dome, a spring in the valve member for actuating the plunger, and an adjustable sleeve extending into the valve member forming a guide for the plunger therein, and further constituting an abutment for the spring.

2. A check valve assembly as set forth in claim 1 in which the portion of said valve chamber which telescopes within the gland member is externally threaded whereby on removal of the gland member, the chamber, valve member, plunger, spring and sleeve may be removed from the housing as a unit.

VERNON E. GLEASMAN.

REFERENCES CITED

The following references are of record in the file of this patent:

UNITED STATES PATENTS

| Number | Name | Date |
| --- | --- | --- |
| 2,035,129 | Hopkins | Mar. 24, 1936 |
| 151,027 | Hodgins | May 19, 1874 |
| 487,029 | Gray | Nov. 29, 1892 |

FOREIGN PATENTS

| Number | Country | Date |
| --- | --- | --- |
| 116,681 | Austria | Mar. 10, 1930 |